United States Patent
Yamazaki

[11] Patent Number: 6,005,243
[45] Date of Patent: Dec. 21, 1999

[54] SYNCHRONOUS ADJUSTMENT METHOD, APPARATUS, AND COMPUTER PROGRAM PRODUCT IN A MULTIPLE BEAM OPTICAL SYSTEM

[75] Inventor: Shuichi Yamazaki, Fujimi, Japan

[73] Assignee: Ricoh Company, Ltd., Tokyo, Japan

[21] Appl. No.: 09/033,644

[22] Filed: Mar. 3, 1998

[30] Foreign Application Priority Data

Mar. 3, 1997 [JP] Japan ................................ 9-047828

[51] Int. Cl.⁶ ..................................................... H01J 3/14
[52] U.S. Cl. ........................ 250/234; 250/205; 359/204; 247/235
[58] Field of Search .................... 250/234, 235, 250/236, 205; 359/201–204; 347/233, 235, 250

[56] References Cited

U.S. PATENT DOCUMENTS

| | | | |
|---|---|---|---|
| 5,140,157 | 8/1992 | Ohshima et al. | 250/235 |
| 5,233,188 | 8/1993 | Arimoto et al. | 250/235 |
| 5,583,557 | 12/1996 | Yamamoto et al. | 347/235 |
| 5,903,378 | 5/1999 | Takano et al. | 359/201 |

FOREIGN PATENT DOCUMENTS

| | | |
|---|---|---|
| 59-26005 | 2/1984 | Japan . |
| 59-26006 | 2/1984 | Japan . |
| 8-077039 | 3/1996 | Japan . |

Primary Examiner—Que T. Le
Attorney, Agent, or Firm—Oblon, Spivak, McClelland, Maier & Neustadt, P.C.

[57] ABSTRACT

A method, system and computer-based product adjusts a synchronous operation of beams in scanning direction of a multiple beam optical system. Alternatively emitted, a standard beam and one of plural beams are scanned across an image forming body in respective scanning operations. During each scanning operation, a time interval (T1) is measured from when the standard beam is detected by a detector to when the other beam is detected. Similarly, another time interval (T2) is measured from between when the other beam is detected to when the standard beam is detected. Time intervals T1 and T2 are compared so as to distinguish the arrival order of beams and then the beams are adjusted at the source so as to compensate for a detected incorrect order or misalignment of the beams.

20 Claims, 14 Drawing Sheets

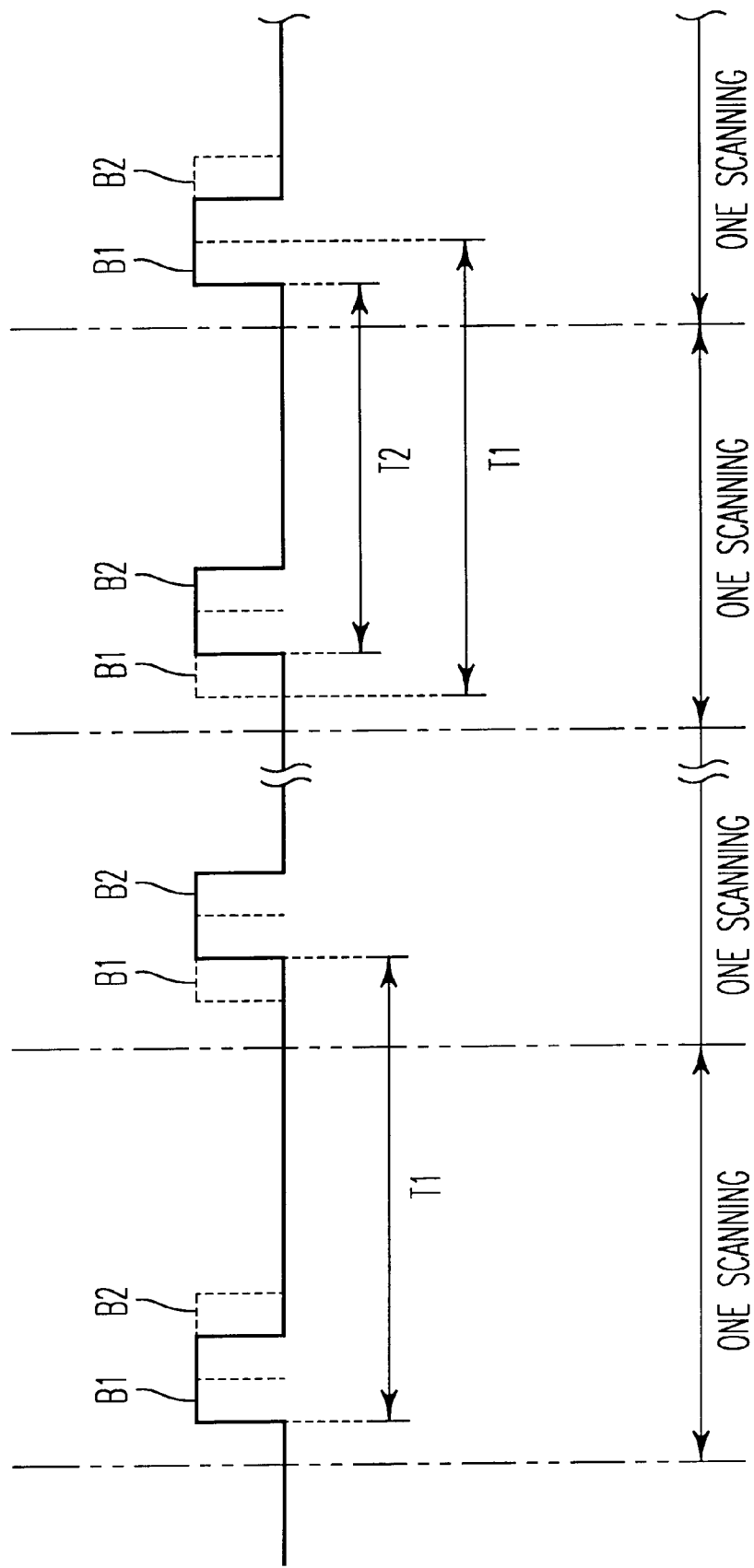

SYNCHRONOUS ADJUSTMENT METHOD, APPARATUS, AND COMPUTER PROGRAM PRODUCT IN A MULTIPLE BEAM OPTICAL SYSTEM

CROSS-REFERENCE TO RELATED APPLICATIONS

This document contains subject matter related to that disclosed in U.S. application Ser. No. 08/786,203, filed Jan. 21, 1997, now U.S. Pat. No. 5,786,594, and U.S. application Ser. No. 08/653,694, filed May 23, 1996, now U.S. Pat. No. 5,753,907, the contents of both of which are incorporated herein by reference.

BACKGROUND OF THE INVENTION

1. Field of the Invention

This invention is generally related to a method, apparatus and computer program product that adjusts synchronously beams in a multiple beam optical system, and more particularly relates to detecting and adjusting beams in a multiple beam optical system, where the detection and adjustment of beams is performed in a scanning direction between plural beams that are scanned on a photoconductive member.

2. Background of the Invention

To increase the efficiency in image duplicating devices such as copiers, printers and facsimile machines, a speed of scanning optical beams used in conventional image forming processes has recently been improved. Referring to the FIG. 1, one conventional optical system in a laser beam-based image forming apparatus includes a synchronous detecting device shown as photodetector 6. A beam emitted by a light source unit 1 is projected onto the polygon mirror 3 via an optical lens 2. The polygon mirror 3 is rotated at a predetermined angular velocity in a predetermined direction (shown as a counter clockwise direction as indicated by an arrow in FIG. 1). The beam is scanned within a predetermined scanning angle, and the scanned beam enters into a pair of lenses 4a and 4b and a reflector 9 before reaching the photoconductive drum 5. The above-described optical lens system is exemplary of that used in conventional systems.

In order to maintain a predetermined desired image forming starting point of each scanning operation (i.e., scan line) in the scanning direction on the photoconductive drum 5 after the beam has exited the optical lenses 4a and 4b, the beam is detected by the photodetector 6, located near the photo conductive drum 5. A scanning synchronous controller 7 calculates a time (or distance, which is related to the time) difference between a signal corresponding to the predetermined desired image forming starting point on the photoconductive drum 5 and a signal from the beam detected by the photodetector 6. The scanning synchronous controller 7 determines a revision value based on the time, or distance, difference. The scanning synchronous controller 7 also controls the light source unit 1 on the basis of the revision value where image data is used to modulated the light source at a time that corresponds to the beginning of a scan line.

The above-described feedback loop allows the system to maintain the predetermined desired starting point of the beam in the scanning direction on the photoconductive drum 5.

In the above-described system, the polygon mirror 3 has multiple reflecting surfaces. When the polygon mirror 3 is rotated at a high speed, the beam is scanned in a predetermined direction on the surface of the photoconductive drum 5 so as to form an image thereon. The beam is modulated on and off according to image data corresponding to the scan line. Thus, a scanning angle is defined as a relative angular range of the reflecting surface of the polygon mirror 3 about its rotational axis for covering the horizontal scan distance on the photoconductive drum 5.

However, as determined by the present inventor, at the high rotational speed, a number of undesirable effects need to be considered, such as increased noise and heat, shortened driving motor lifetime for the polygon mirror 3, an expensive bearing unit, a need for a high-intensity laser unit, etc. The extent of these problems generally worsen as the rotational speed is further increased. The costs for solving these associated problems are prohibitive, and another approach is therefore preferred.

Rather than increasing the rotational speed of the polygon mirror 3, other systems employ multiple laser beams that are simultaneously scanned so as to shorten an amount of time to form an image on the photoconductive drum. In other words, if three beams were simultaneously used to scan three lines, it would take only one third of the time as compared to a single laser beam. To take advantage of the multiple beams, the beams should be synchronized in the scanning direction and correctly calibrated to begin scanning at predetermined position, such as at the beginning of a scan line.

However, in the conventional multiple laser beam optical system, the scanning start points of each beam never completely coincide in the scanning direction. Therefore, the difference of the scanning start points in each beam needs to be revised using an adjustment method, particularly when each beam does not appear to the detector 6 as being completely separate from other beams.

If the plural beams are sufficiently separated in the scanning direction, the plural beams may be detected with only one photodetector. When each beam is separately distinguishable (e.g., not overlapping) as shown in FIG. 2, the photodetector 6 independently detects each beam. Referring to FIG. 3, the pulses detected by the photodetector 6 are completely separated from each other in time and thus distinguishable from one another.

Synchronization of each beam is performed during a non-image forming period in a scanning operation. In other words, synchronization is performed between where each beam is detected with the photodetector 6 and when an image forming scan line process starts on the photoconductive drum 5. The faster polygon mirror rotates, the shorter this non-image forming period becomes. Therefore, if the time interval between each beam is too wide, it is difficult to carry out the synchronization operation during the above non-image forming period.

Referring to FIGS. 4 and 5, it is seen that when the plural beams are not sufficiently separated in time, the detected signals overlap in time. In this case the scanning synchronous controller 7 may judge the overlapped signals as one signal which makes it difficult for the scanning synchronous controller 7 to properly perform the synchronization operation.

Some conventional multiple beam optical systems have attempted to solve the above problem. One of these systems is disclosed in Japanese Laid Open JP 59-26,005, in which the optical system uses plural photodetectors arranged to receive respective of the beams. The plural photodetectors are step-wisely positioned along the scanning direction and offset in a direction normal to the scanning direction. The above-described optical system carries out a series of steps including irradiating one detector with only one beam, detecting the beam with the photodetector corresponding to that laser beam and turning-off of the respective beams in the order of arrival at the respective photodetector.

However, the present inventor identified that the expense of including plural photodetectors detracts from the value of the system. Furthermore, each beam must be handled separately so as to ensure proper alignment of the source and detectors during final assembly in the optical system, creating a risk that the clearance of the plural photodetectors differs between image forming apparatuses. Referring to FIG. 6, when the above optical system is assembled in the image forming apparatus during final assembly, the clearance of each photodetector needs to be revised on the basis of the shift of each beam in the scanning direction, thereby increasing manufacturing cost.

SUMMARY OF THE INVENTION

Accordingly, one object of the present invention is to provide a method, computer program product and apparatus for adjusting optical beams that is improved with respect to conventional methods and apparatuses.

This and other objects may be accomplished with a method, computer program product and apparatus in which plural beams are emitted from a beam source. The beams are reflected off faces of a rotatable mirror, where the rotation of the mirror causes the beams to be scanned across an image forming body, such as a photosensitive drum. Initially one beam may be offset with respect to another beam, such that an edge of an image formed by the beams becomes staggered due to a lateral offset between successive beam scan lines. In order to compensate for the lateral offset, the beams are emitted in particular sequences, and a time-distance relationship between the respective beams is determined by detecting with a detector the presence of the beams at a fixed location near the image forming body, and analyzing the detection results with a processor. Measuring a relative time-distance between successively scanned beams, as detected by the detector, allows the processor to determine which of the beams first arrives at the detector. Measuring and contrasting time-distance measurement values associated with simultaneously emitted beams followed by individually emitted beams allows the processor to determine an amount of compensation that is needed in order to align the beams along an edge of an image and thus provide a synchronous operation. A combination of processing techniques is also included so as to allow for the identification of relative order of arrival of the beams and an amount of compensation needed for beam alignment and synchronous beam operation.

One aspect of the present invention is to solve the above and other problems, with a method and apparatus of adjusting a synchronization of beams in a scanning direction on an intermediate image-forming surface, such as a photoconductive drum. A plurality of light sources are placed in an array in a light source unit where the light sources emit respective optical beams. A standard beam and one of the other beams are alternately emitted during each scanning operation, and are then detected. Based on the detected beams, a first time interval (T1) is measured between the reception of the standard beam and the other beam. Then, a second time interval (T2) is measured from a detection signal of the other beam to a detection signal of the standard beam. An order of arrival of the beams is determined as detected by the photodetector on the basis of the first time interval and the second time interval.

According to a second aspect of the present invention, a method and apparatus of adjusting a synchronous operation of beams in a scanning direction on an intermediate image-forming surface, a standard beam is simultaneously emitted with another beam and the standard beam and the other beams are detected. A total width of the detected pulses corresponding to the beams are measured, where the interval measured is between a start-up edge of the total width of the detected pulses and start-up edge of the detected pulse corresponding to the final arrived beam at a photodetector. Then, a pitch of the beams is adjusted in the scanning direction on the basis of the measured time interval.

According to a third aspect of the present invention, a method and apparatus of adjusting relative beam position in a scanning direction on an intermediate image-forming surface, a standard beam only is emitted during a first scanning operation and then detected, followed by emitting only a second beam during a second scanning operation and detecting the second beam. Then, measuring a first time interval (T1) between a detection signal of the standard beam during the first scanning operation and another detection signal of the second beam during the second scanning operation. Subsequently, emitting and detecting only the second beam during a third scanning operation and emitting and detecting only the standard beam during a fourth scanning operation. A next step includes measuring a second time interval (T2) between a detection signal of the standard beam during the third scanning operation and another detection signal of the second beam during the fourth scanning operation and detecting an arrival order of the respective beams at a photodetector on the basis of the measured time intervals.

BRIEF DESCRIPTION OF THE DRAWINGS

Other aspects and further features of the present invention will become apparent from the following detailed description when read in conjunction with the accompanying drawings, wherein:

FIG. 10 is a time series of pulses detected with the photodetector of the first embodiment according to the present invention;

DESCRIPTION OF THE PREFERRED EMBODIMENT

Figure 1:
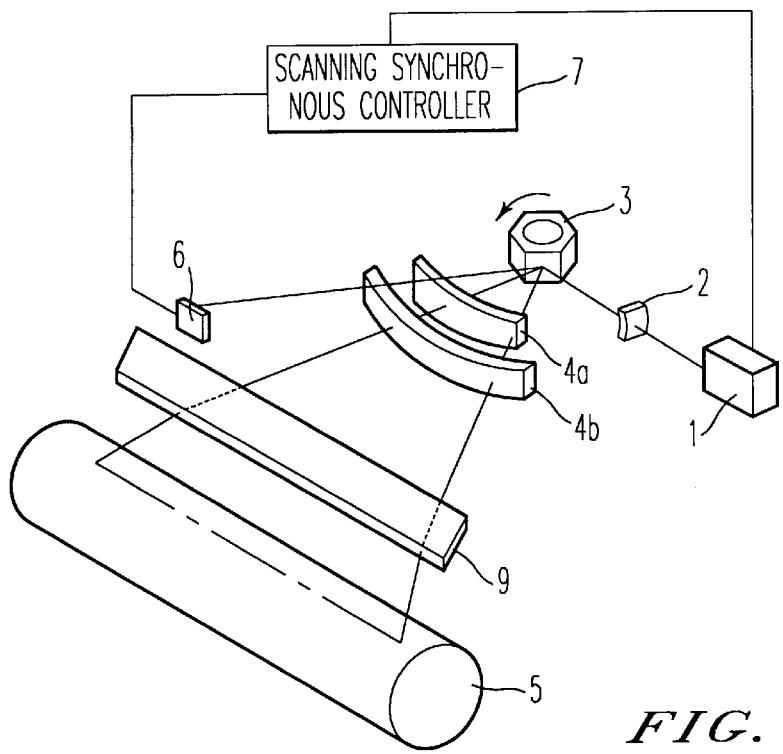
FIG. 1 is a perspective view of a conventional optical system in an image forming apparatus according to the prior art.
Figure 2:
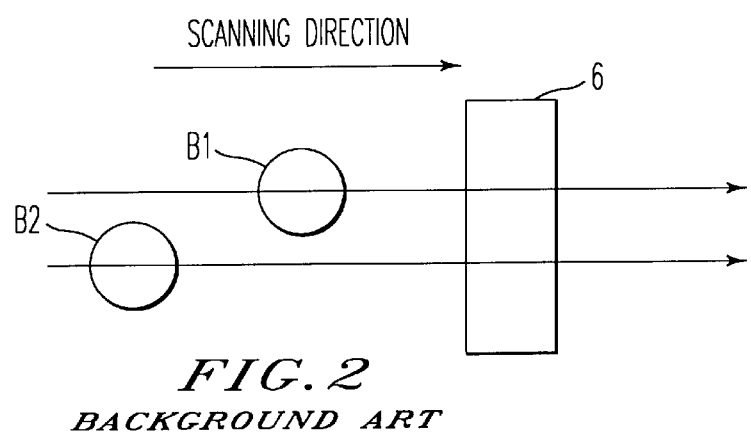
FIG. 2 illustrates a relative location of the photodetector and beam spots in a multiple-beam system.
Figure 3:
FIG. 3 is a time series of pulses detected with the photodetector of the system shown in FIG. 2.
Figure 4:
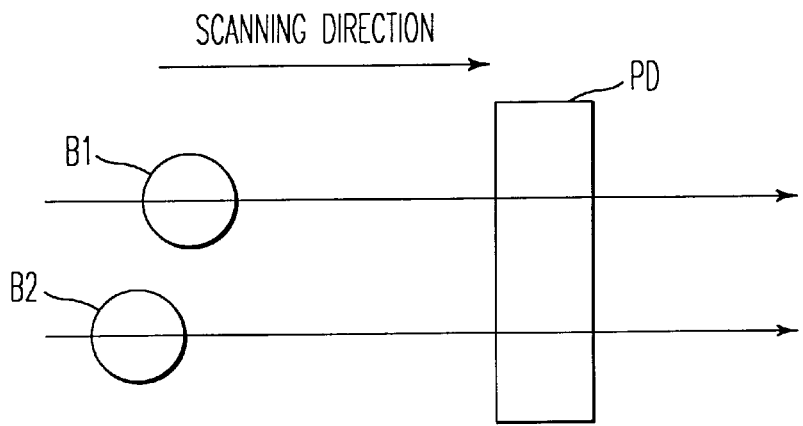
FIG. 4 illustrates a relative location of photodetectors and beam spots in the multiple-beam system that employs plural photodetectors.
Figure 5:
FIG. 5 is a time series of pulses that overlap in time as detected by the photodetector corresponding to FIG. 4.
Figure 6:
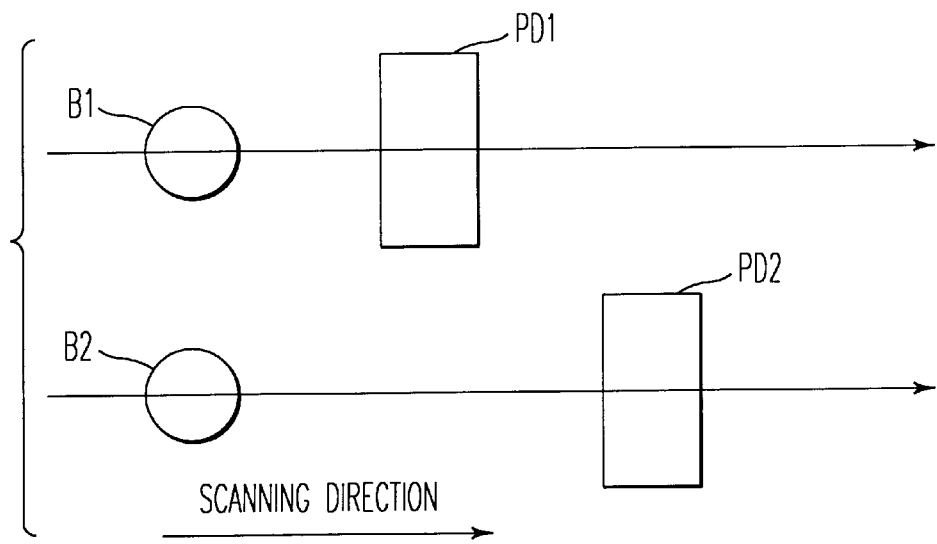
FIG. 6 illustrates a relative location of photodetectors and beam spots in a multiple-beam system according to the prior art.
Figure 7:
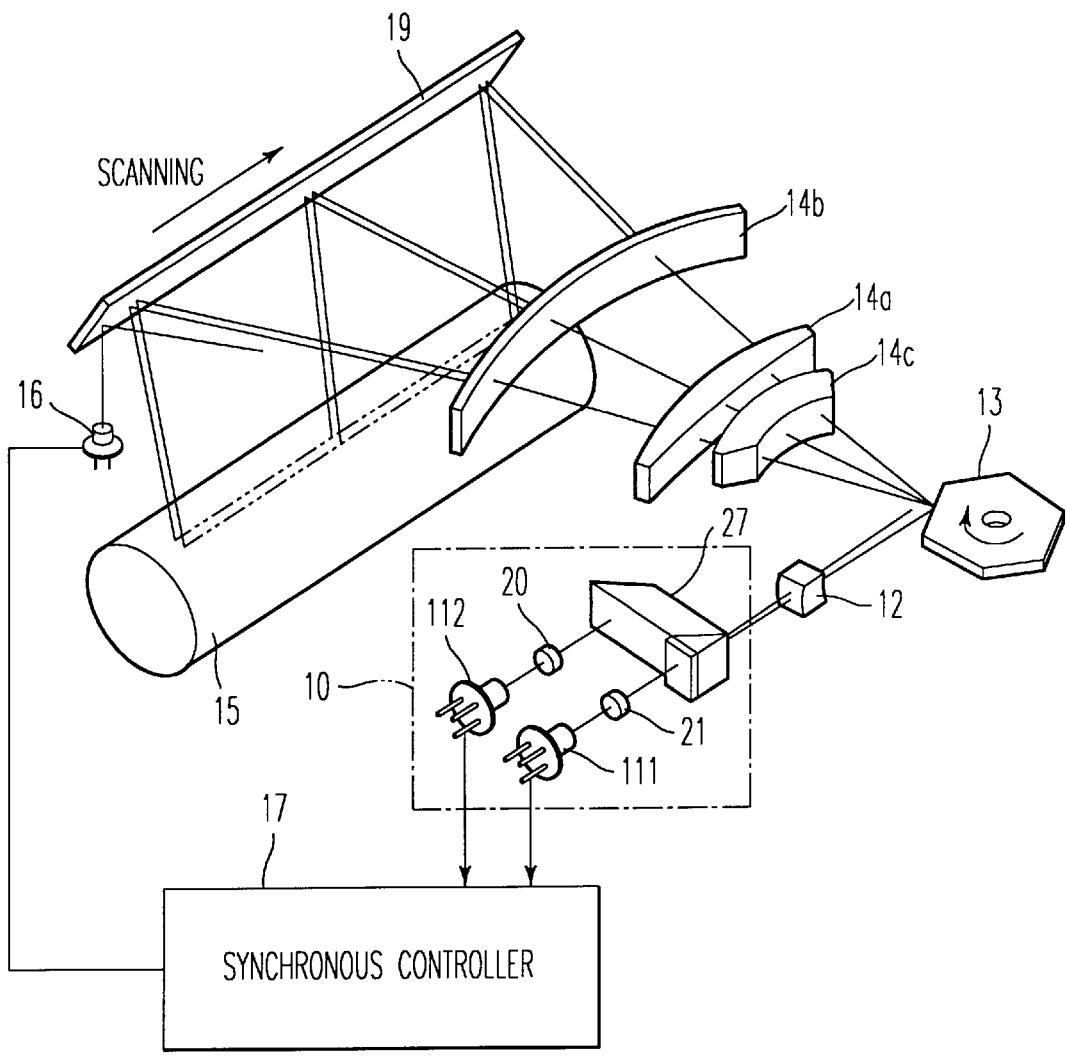
FIG. 7 is a perspective view of an optical system of an image forming apparatus according to the present invention.

Referring now to the drawings, wherein like reference numerals designate identical or corresponding structures throughout the several views, and referring in particular to FIG. 7 thereof, there is illustrated a multiple-beam synchronous adjustment system according to the current invention. The system includes an adjustable light source unit 10 which emits multiple beams that are projected onto a polygon mirror 13 via an optical lens 12. The polygon mirror 13 rotates at a predetermined angular velocity in a predetermined direction as indicated by the arrow in FIG. 7. The beams are scanned within a predetermined scanning angle and the scanned beams pass through a series of lenses 14a and 14b and 14c and a reflector 19 before reaching a surface of a photoconductive drum 15. The above-described optical lens system is merely exemplary and does not require the specific lens combination shown.

In order to maintain a predetermined amount of synchronization in the scanning direction between beams on the photoconductive drum 15 after the beams have exited the optical lenses 14a and 14b and 14c, the spots of each laser beam are detected by a photodetector 16 located near the photoconductive drum 15. A synchronous controller 17 controls a starting point of the image for each laser beam (called an "image form starting-point") based on a difference between the measured image form starting point of the beams and the predetermined desired point along the scanning direction. This difference is an amount of adjustment needed to maintain the desired synchronous operation of the beams, where the beams, when perfectly synchronized, allow the edges of respective scanned lines to be aligned to one another. Furthermore, the synchronous controller 17 converts the adjustment amount in distance to a number of pulses to activate a pair of light emitting elements 111 and 112. The above-described feedback loop allows the system to maintain the predetermined desired amount of synchronization of the beams on the photoconductive drum 15. The initially selected synchronous point is maintained by the above-described same feedback information based on direct measurement.

Figure 8:
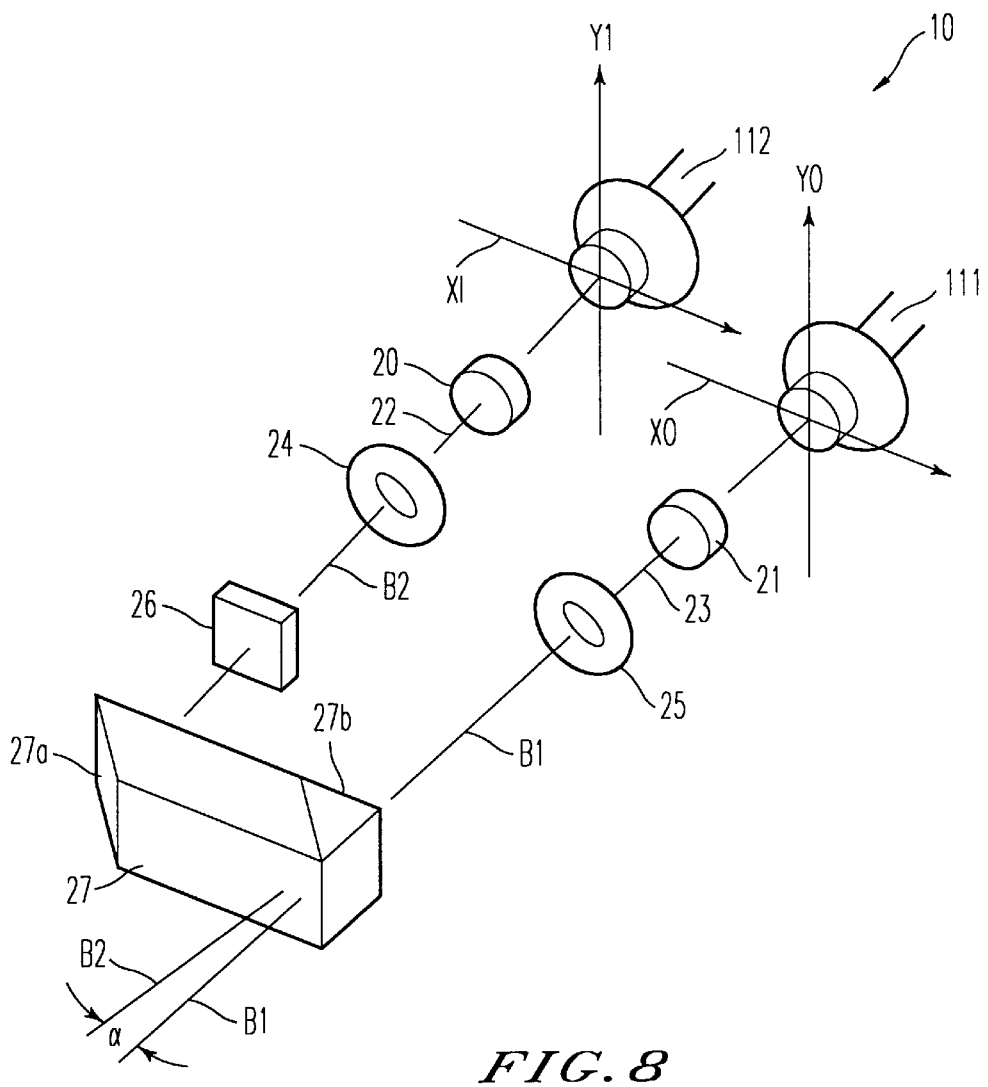
FIG. 8 is a detailed perspective view of a light source unit according to the present invention.

Now referring to FIG. 8, the light source unit 10 houses plural light sources. A pair of the light emitting elements 111 and 112, such as laser diodes, is placed in an array, and the center of each light emitting diode 111 and 112 is indicated by an origin of the X, Y axes. The two pairs of X Y axes (X0, Y0 and X1, Y1) are parallel to each other, and the X-axes may coincide with one another. Each of the light emitting elements 111 and 112, respectively projects light in a direction perpendicular to a respective X-Y plane through its origin towards a corresponding collimator lens 20 and 21. The collimator lenses 20 and 21 convert the emitted light into substantially parallel arrays of light 22 and 23, and the parallel beams 22 and 23 enter respective apertures 24 and 25.

After exiting the apertures 24 and 25, a beam B2 enters a polarizer plate 26 for selecting a plane of polarization for the light in the beam B2. The beam B2 then enters a prism 27 and is reflected by an internal surface 27a and a beam splitter reflecting surface 27b before exiting the prism 27. The beam B1 enters the beam splitter 27b in the prism 27 from the opposite side and a portion of the beam B1 exits the prism 27 without being reflected. As a result, the beams B1 and B2 are placed substantially close to each other, and the angle formed by optical axes of the beams B1 and B2 is a predetermined angle α. The angle α is caused by an amount of eccentricity between the laser diode 111 and the collimator lens 20.

Figure 9:
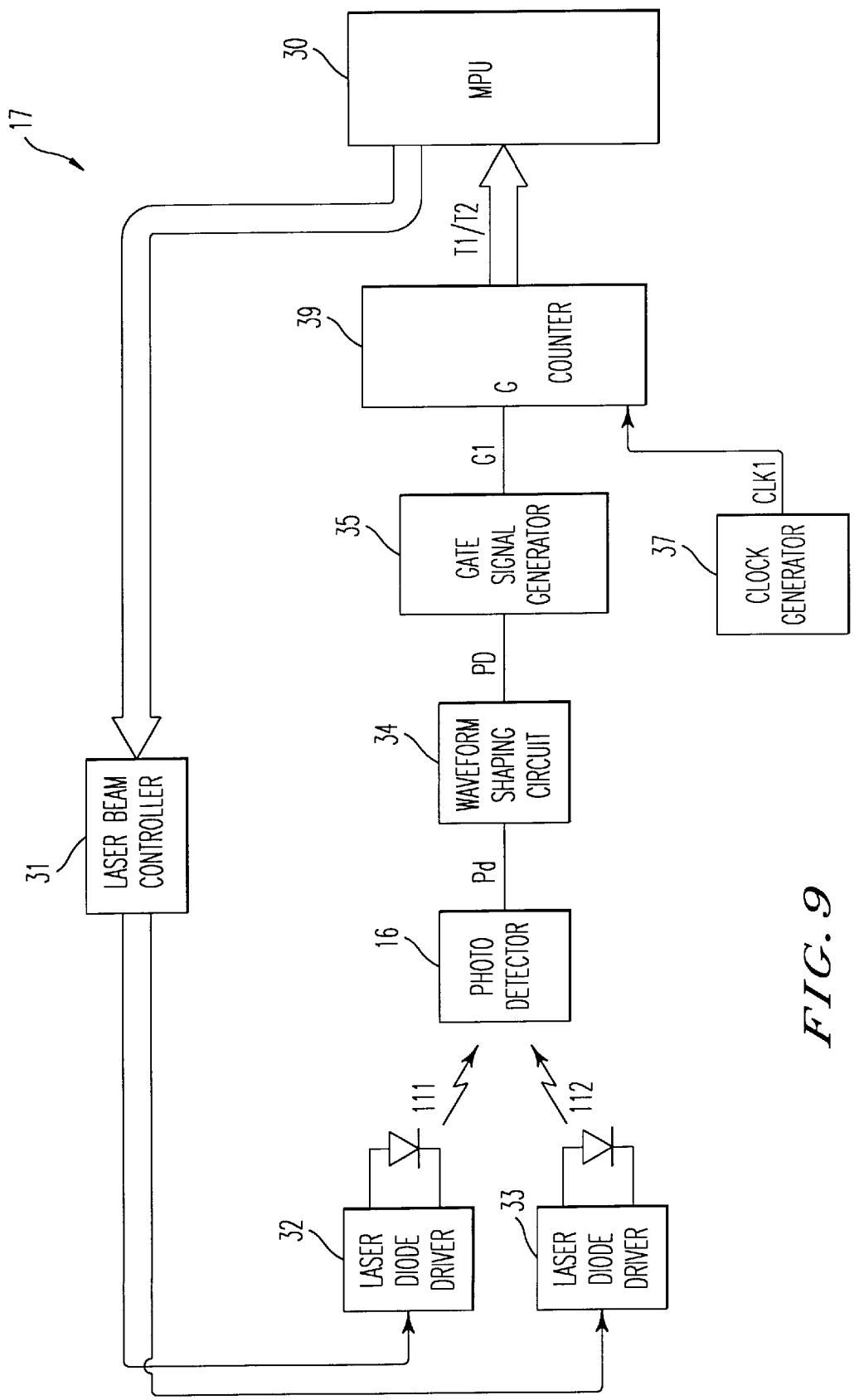
FIG. 9 is a block diagram of the synchronous controller of the multiple beam system in the first embodiment according to the present invention.

Now referring to FIG. 9, the optical system has the synchronous controller 17 which includes a Microprocessor Unit (MPU) 30, although other controllers implemented in programmable device, programmable logic, application specific logic, etc. may be used as well. When the MPU 30 outputs a control signal to a laser beam controller 31, the laser beam controller 31 controls the laser Diode driver 32 and 33 to operate according to a predetermined timing sequence. As a result, the laser diodes 111 and 112 emit beams under control of the respective laser diode drivers 32 and 33. The polygon mirror 13 synchronously rotates when the respective laser diodes 111 and 112 emit the laser beams. The laser beams reflect off the surfaces of the polygon mirror 13 and enter the photodetector 16.

Figure 11A:
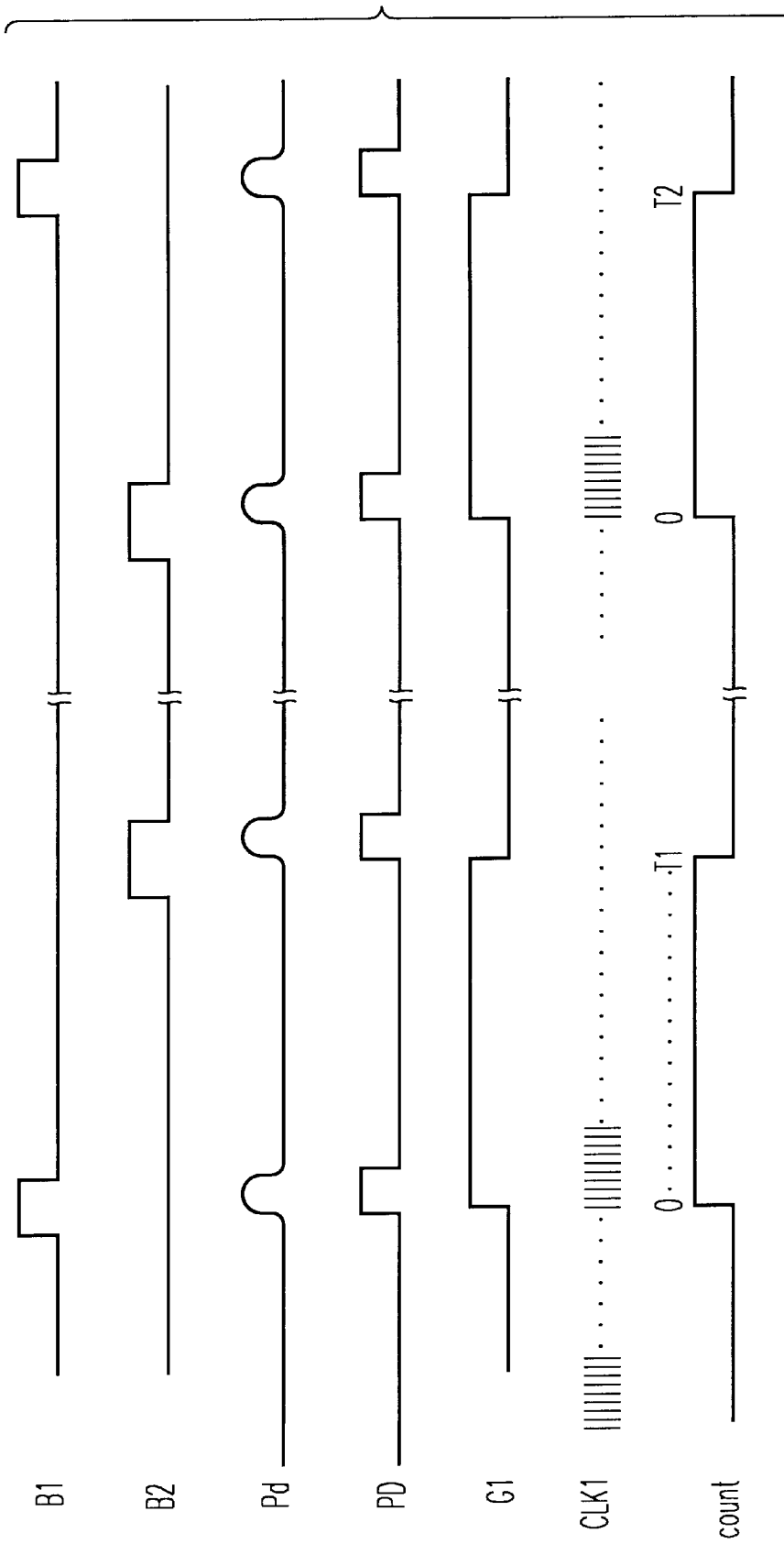
FIG. 11A is a timing diagram of selected pulses used by the synchronous controller of the multiple beam system in the first embodiment.

Now referring to both FIGS. 9 and 11A, when the photodetector 16 detects the respective laser beams, the photodetector 16 generates a synchronizing detect pulse in a signal Pd. A waveform shaping circuit 34 restores the synchronizing detect pulses in the signal Pd to rectangular wave pulses in a signal PD. The restored rectangular wave pulses in the signals PD are output to a gate signal generator 35. After inputting a first rectangular wave pulse in the signal PD, the gate signal generator 35 generates a transition in the gate signal G1. A counter 39 receives a clock signal CLK1 from a clock generator 37 and counts the clock pulses therefrom only when the gate signal G1 remains at a predetermined level, such as a logic level "high", as shown. Certainly, active low logic and other types of logic (programmable or not, or the microprocessor itself) may be used as well. The gate signal G1 returns to the original level so as to disable the counter 39 when a second pulse in the signal Pd is received, as shown in FIG. 11A.

The count is outputted to the MPU 30, which has a memory contained therein (or alternatively an external accessible memory, such as a RAM or ROM), which holds a program that when executed by the MPU 30 calculates an arrival time interval of the laser beams at the photodetector 16 and distinguishes an arrival order of the laser beams based on the accumulated count of clock pulses.

According to the above described synchronous controller 17, the laser beam controller 31 controls the laser diode drivers 32 and 33 by which the laser diodes 111 and 112 are alternatively emitted in each scanning operation. The photodetector 16 detects the beam spots corresponding to each laser beams B1 and B2 with the time series of pulses shown in FIG. 10. When the pulse of the laser beam B1 is used as a standard, the MPU 30 measures the interval (T1) between a start-up of the pulse corresponding to the laser beam B1 in a first scan line (scanning operation) and a start-up of the pulse corresponding to the laser beam B2 in a related scan line (scanning operation) on the basis of the inputted counts from the counter 39. Furthermore, the MPU 30 measures the interval (T2) between a start-up of the pulse corresponding to the laser beam B2 in another scanning operation and a start-up of the pulse corresponding to the laser beam B1 in a related scanning operation.

In FIG. 10, a solid line shows the actually obtained pulses when the laser diodes 111 and 112 alternatively emit the laser beams in respective scanning operations. A dotted line shows "virtual" pulses if beams from both laser diodes 111 and 112 were to be simultaneously emitted, and is shown this way to simplify understanding this embodiment. The MPU 30 distinguishes the arrival order of the laser beams at the photodetector 16 based upon the above intervals T1 and T2. If the interval T1 (the interval between rising edges of pulses from beam B1 and beam B2) is longer than the interval T2 (the interval between rising edges of the pulses from beam B2 and B1 respectively), the laser beam B1 reaches the photodetector 16 before the laser beam B2, thus being indicative of either B1 or B2 being in need of alignment. On the other hand, if the interval T1 is shorter than the interval T2, the laser beam B2 reaches the photodetector 16 before the laser beam B1. Alternatively, the test may be for the MPU 30 to make an adjustment to the operation of one or both of the beams B1 and B2 only when the magnitude of a difference between T1 and T2 exceeds a predetermined threshold.

Now referring to FIG. 11A again, the pulses in synchronizing detect signal Pd are generated when the laser beam B1 is detected. The pulses in the synchronizing detect signal Pd are restored to rectangular wave pulses in the signal PD corresponding to the laser beam B1. Similarly, more pulses in the synchronizing detect signal Pd are generated when the laser beam B2 is detected. The pulses in the synchronizing detect signal Pd are restored to rectangular wave pulses in the signal PD corresponding to the laser beam B2. The clock pulses from the clock generator 37 are then counted and the gate signal G1 is outputted at a level that enables the counter 39 during the interval T1 between the start-up of the rectangular wave pulse in the signal PD corresponding to the laser beam B1 and rectangular wave pulse in the signal PD corresponding to the laser beam B2. Similarly, the pulses in the synchronizing detect signal Pd are generated when the laser beam B2 is detected. Similarly, the clock pulses from the clock generator 37 are counted when the gate signal G1 is high, during the interval (T2), between the start-up of the rectangular wave pulse in the signal PD corresponding to the laser beam B2 and rectangular wave pulse in the signal PD corresponding to the laser beam B1. By determining the difference between T2 and T1, the MPU 30 is informed as the which of the beams B1, B2 needs to be adjusted and by how much in order to align the beginning of each scan line to one another.

Figure 11B:
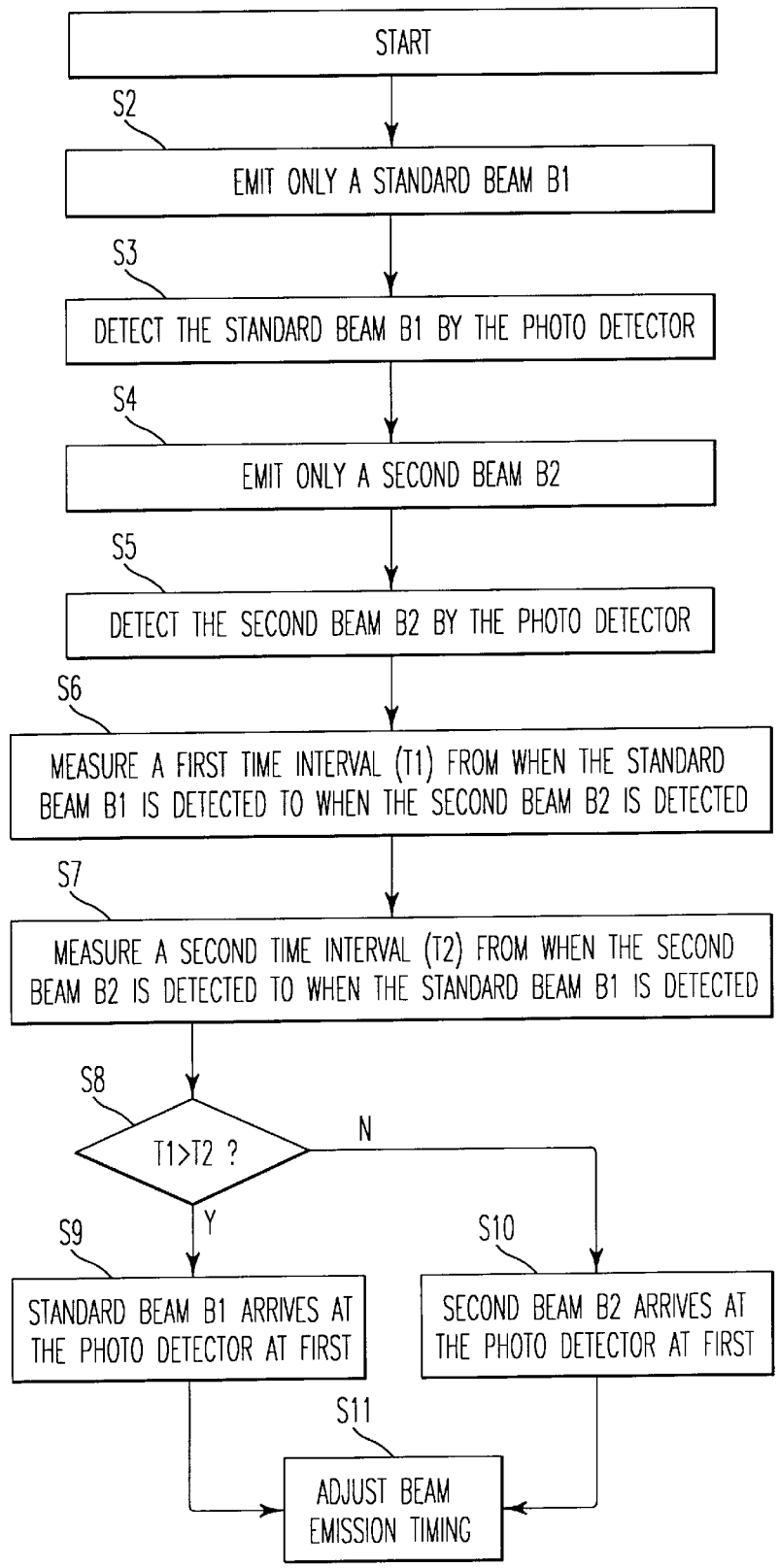
FIG. 11B is a flowchart of a process for synchronizing beams according to the first embodiment of the present invention.

A process flow for the first embodiment is shown in FIG. 11B. The process begins in step S2 where a standard beam B1 is emitted at a predetermined time. The process then proceeds to step S3 where the standard beam B1 is detected by the photodetector 16. Subsequently, the second beam B2 is emitted in step S4, and then, in step S5, the second beam B2 is detected by the photodetector 16. After the detection of the beams B1 and B2, timing information is provided to the MPU 30 where in step S6, a first time interval T1 is measured from a time when the standard beam is detected to when the second beam B2 is detected. A measurement is also made in step S7 where a second time interval T2 is measured from when the second beam B2 is detected to when the standard beam B1 is detected. Because the standard beam B1 and the second beam B2 are repeatedly transmitted at predetermined intervals, the measurement between the times when the standard beam B1 and B2 are detected need only be between adjacent detected pulses associated with the transmission of the standard beam B1 and the second beam B2.

After step S7, the process proceeds to step S8 where an inquiry is made regarding whether T1 is greater than T2. If the response in step S8 is negative, the process proceeds to step S10 where it is determined that the second beam B2 arrives at the photodetector 16 before the first beam. However, if the response to the inquiry in step S8 is affirmative, the process proceeds to step S9, where it is determined that the standard beam B1 first arrives at the photodetector 16. Based on the determination in steps S9 and S10, the process proceeds to step S11 where the respective timing between emitting the standard beam B1 and the second beam B2 are adjusted so as to obtain the desired relative spacing between the beams.

Figure 12:
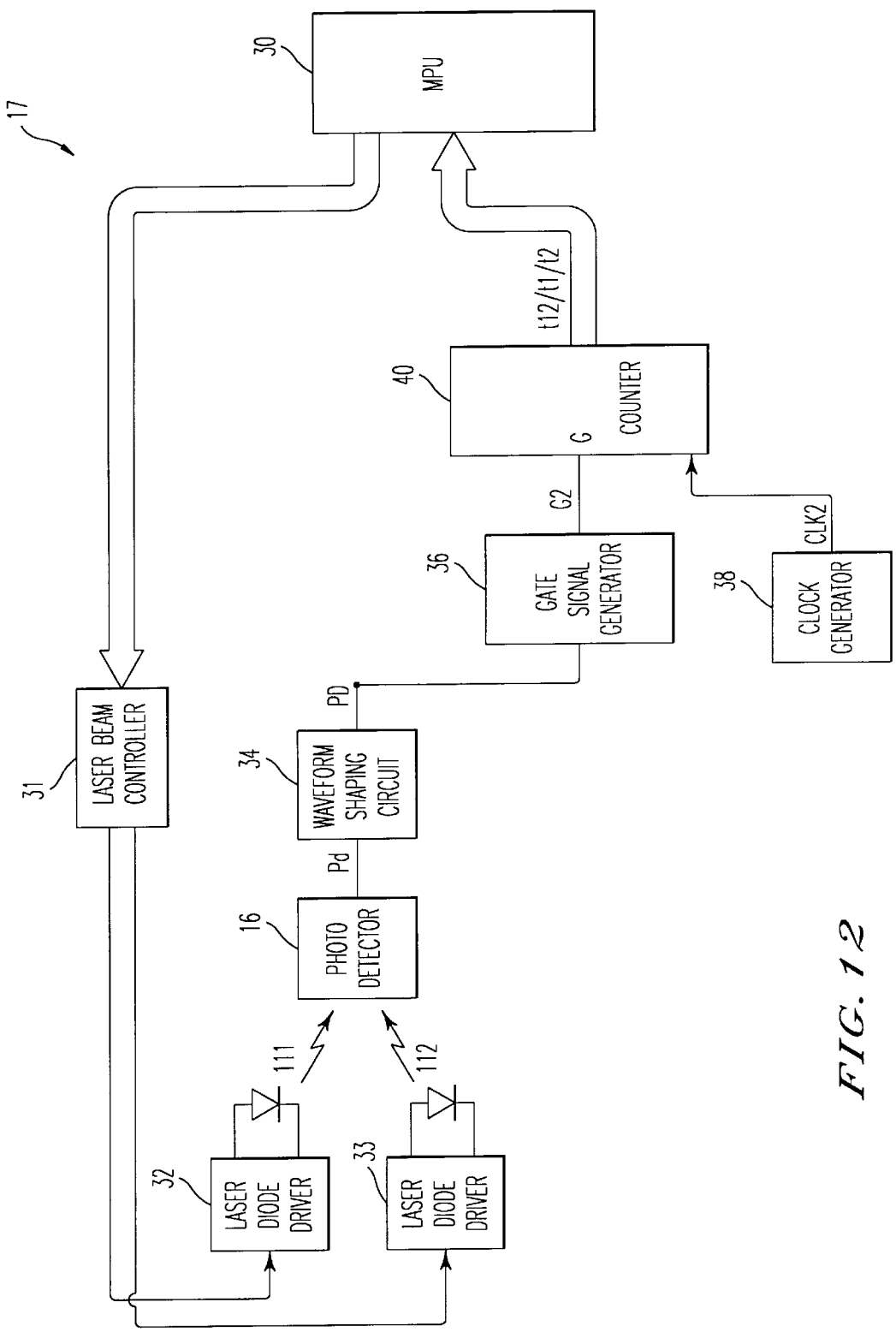
FIG. 12 is a block diagram of the synchronous controller of the multiple beam system in the second embodiment of the present invention.

Now referring to FIG. 12, a second embodiment of the present invention is described. The synchronous controller 17 has a counter 40 counts clock pulses during a time when pulses are present and being detected by the photodetector 16, and when the arrival order of the laser beams B1 and B2 has already been decided. In the second embodiment, the later arriving laser beam is presumed to be the beam B2.

When the MPU 30 outputs a control signal to the laser beam controller 31, the laser beam controller 31 controls the laser Diode drivers 32 and 33 with a predetermined timing sequence. As a result, the laser diodes 111 and 112 simultaneously emit beams under control of the laser diode drivers 32 and 33. The polygon mirror 13 synchronously rotates when the laser diodes 111 and 112 emit the laser beams. The laser beams, which reflect off one surface of the polygon mirror 13, enter the photodetector 16. When the photodetector 16 detects each of laser beams, the photodetector 16 generates a pulse in the synchronizing detect signal Pd. A waveform shaping circuit 34 restores the pulses in the synchronizing detect signal Pd to rectangular wave pulses in the signal PD. The restored rectangular wave pulses in the signal PD are output to a gate signal generator 36 that generates the gate signal G2. A counter 40 counts clock cycles in a clock signal CLK2 from a clock generator 38 only when the gate signal G2 is at a level that signifies that the counter should count. The count is then output to the MPU 30. Furthermore, the MPU 30 controls the laser diodes 111 and 112 independently so as to emit the respective beams therefrom during each scanning operation. The independence allows the MPU 30 to compensate for system variations that may cause a misalignment of the beams B1 and B2. Such misalignment may be the result of imperfections in the respective faces of the mirror 13, lens system 14a–14c, etc.

Figure 13:
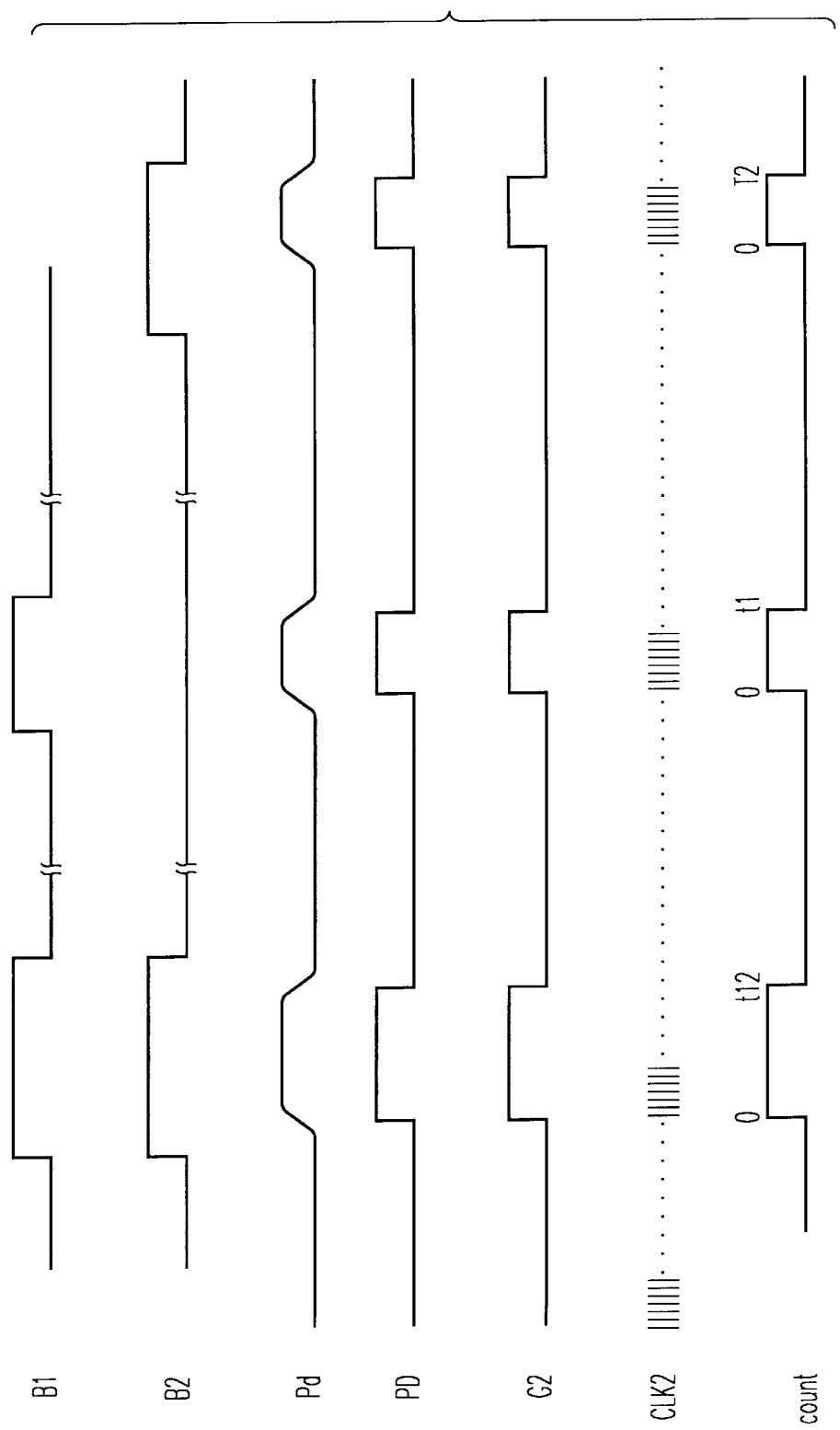
FIG. 13 is a timing diagram of selected pulses used for beam synchronization by the synchronous controller of the multiple beam system in the second embodiment.

Now referring to FIG. 13, the laser beams B1 and B2 are simultaneously emitted during a first scanning operation such that the laser beams B1 and B2 interact with the photodetector at the same time and produce overlapped pulses. The overlapped pulses are restored to a rectangular wave pulse in the signal PD via the synchronizing detect signal Pd. The clock pulses are counted when the gate signal G2 is outputted at a predetermined level that enables the counter 40 during the interval t12, which is a total width of the overlapped pulses.

Only the beam B1 is emitted during a second scanning operation, and the synchronizing detect signal Pd is generated with a pulse corresponding to the beam B1. The pulse in the synchronizing detect signal Pd is restored to a rectangular wave signal PD, corresponding to the laser beam B1. The clock pulses are counted when the gate signal G2 is outputted during the interval t1 which is a width corresponding to the time the laser beam B1 interacts with the photodetector 16.

Similarly, only beam B2 is emitted during a third scanning operation and pulse in the synchronizing detect signal Pd is generated corresponding to the beam B2. The pulse in the synchronizing detect signal Pd is restored to a rectangular wave pulse in the signal PD corresponding to the laser beam B2. Clock pulses are counted when the gate signal G2 is outputted at the predetermined level during the interval t2, which is a width of a pulse having a corresponding length of time with which the laser beam B2 interacts with the photodetector 16.

Figure 14:
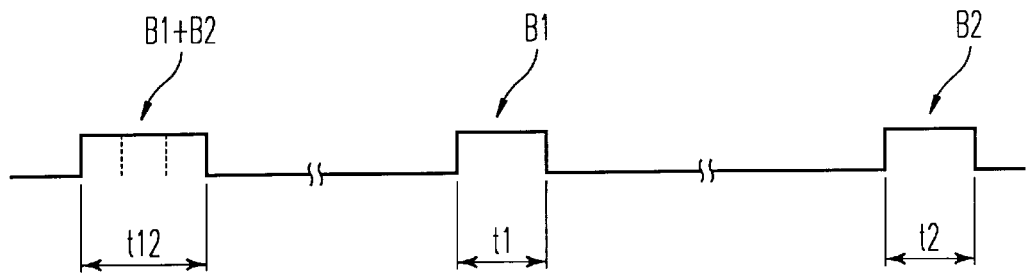
FIG. 14 is a time series of pulses detected with the photodetector in the second embodiment.
Figure 15A:
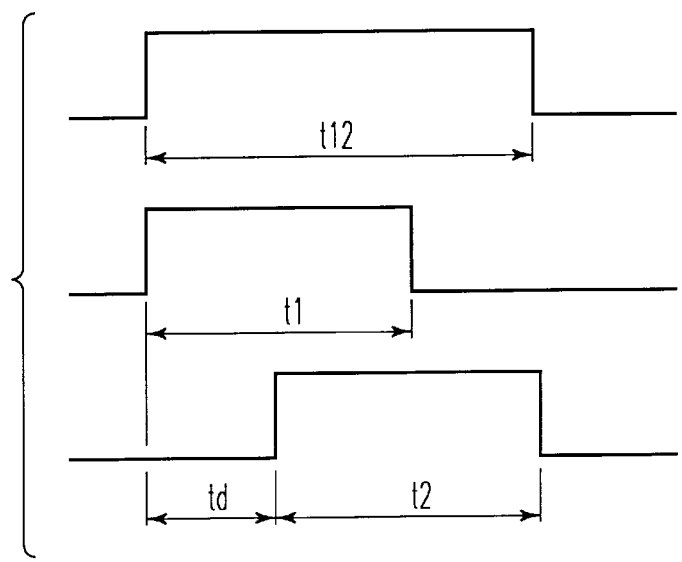
FIG. 15A illustrates in detail detection pulses from the photodetector in the second embodiment.

Now referring to FIGS. 14 and 15A, the MPU 30 calculates the total width of the overlapped pulse t12 and also calculates the width of the pulse t1 corresponding to the laser beam B1 and the width of the pulse t2 corresponding to the laser beam B2. A phase difference between the laser beams B1 and B2 is determined as an interval of td between start-up points each beam B1 and B2. The interval td may be calculated by the following equation (1):

$$td = t12 - t2 \quad (1)$$

If the laser beam B2 has reached the photodetector 16 before the laser beam B1, the interval td may be calculated by the following equation (2):

$$td = t12 - t1 \quad (2)$$

In other words, the interval td is a value that subtracted the pulse width of the later single pulse from the total width of the overlapped pulses. From this it can be determined by the CPU 30 the amount of overlap between the pulses corresponding to the beams B1 and B2, and this overlap is indicative of an amount of synchronization of the beams B1 and B2.

Figure 15B:
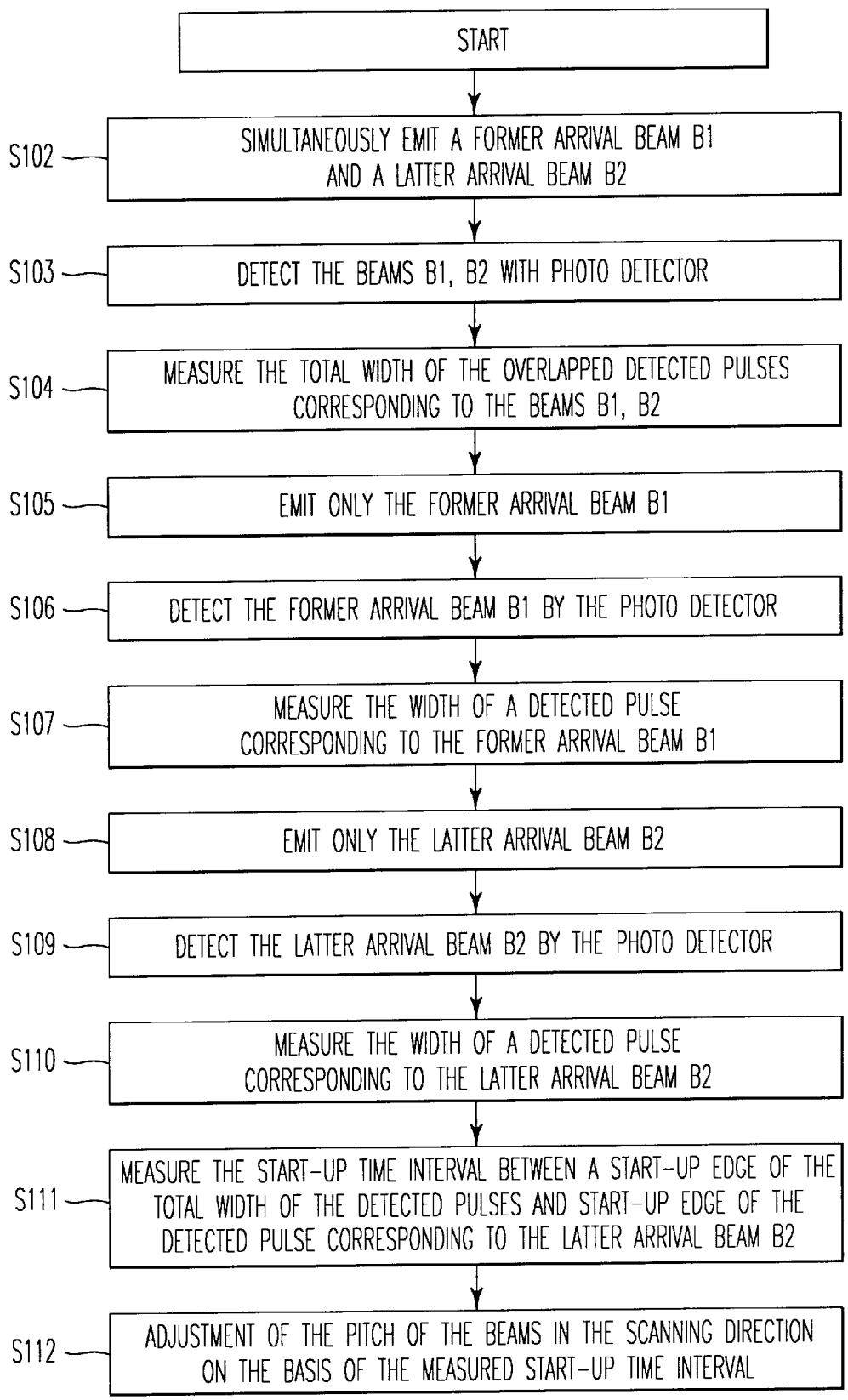
FIG. 15B is a flowchart of a process for synchronizing beams according to the second embodiment of the present invention.

A process flow for the second embodiment is explained by way of FIG. 15B. The process begins in step S102 where a former arrival beam B1 and a later arrival beam B2 are simultaneously emitted. The process then proceeds to step S103 where the beams B1 and B2 are detected with the photodetector 16. Subsequently the process proceeds to step S104 where a measurement is made regarding a total width (a composite width) of the detected pulses associated with the beams B1 and B2. Then, in step S105, only the former beam B1 is emitted, and subsequently detected in step S106. Then, in step S107, a measurement is made of the width of the detected pulse corresponding to the former arrival beam B1. Similar steps to steps S105–S107, are performed in steps S108–S110, with respect to beam B2. The process then proceeds to step S111, where a measurement is made between a starting edge of a total width (composite width) of the detected pulses and a start up edge of the detected pulse corresponding to the later arrival beam B2. Then, the process proceeds to step S112, where an adjustment of the pitch of the beams in a scanning direction is made on the basis of the measured start up time interval, as measured in step S111. Subsequently the process ends.

Figure 16:
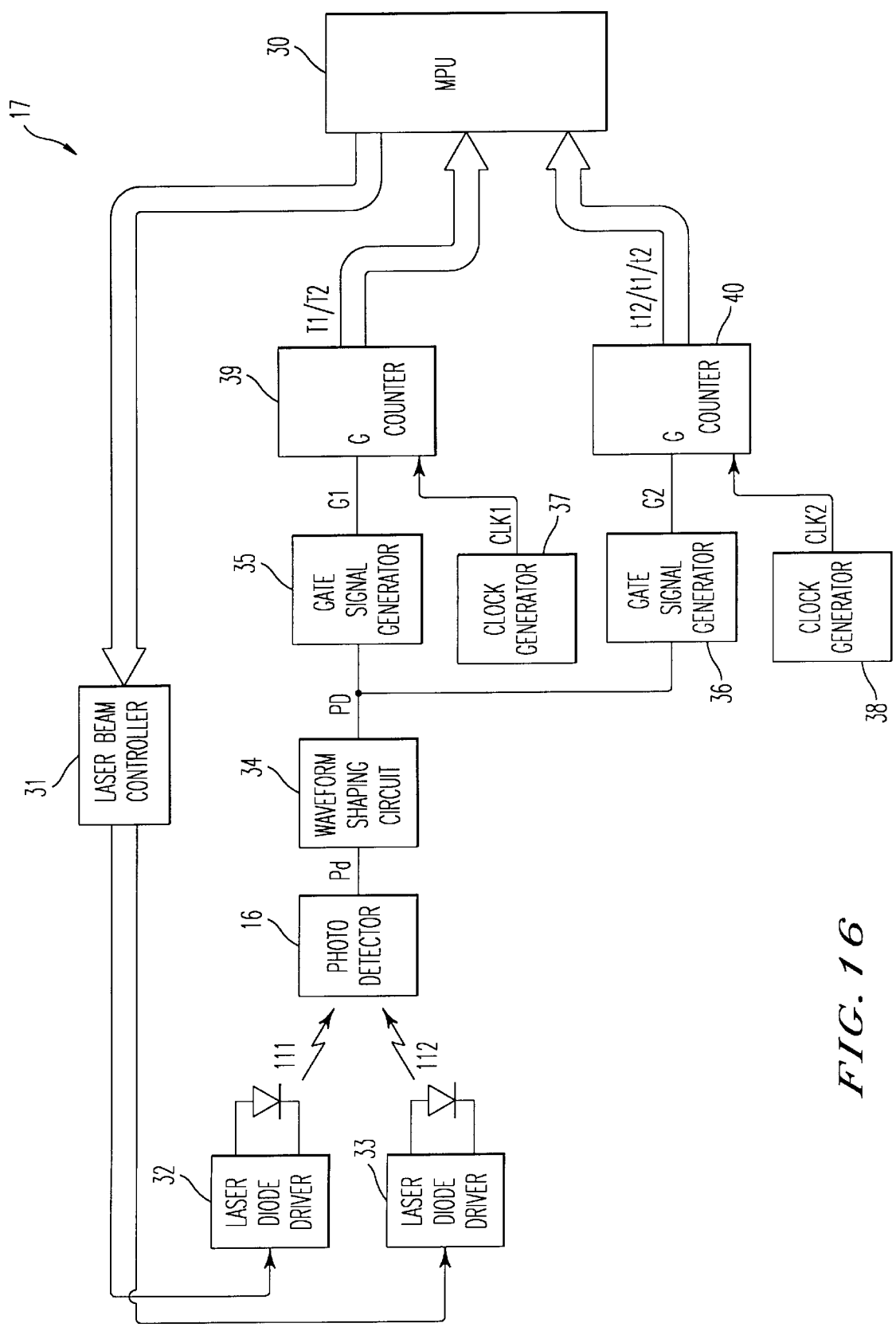
FIG. 16 is another block diagram of the synchronous controller of the multiple beam system according to the present invention.

FIG. 16 describes a third embodiment in which the arrival order of the beams at the photodetector 16 has not been previously decided. In this case, the synchronization of the beams in the scanning direction is adjusted by a combined method which combines features of the first embodiment and the second embodiment. The arrival order of the beams at the photodetector 16 is distinguished by the method employed in the first embodiment. Then, the difference of the image form starting point of each beam in the scanning direction is adjusted by the method employed in the second embodiment on the basis of the arrival order as determined according to the description provided for the first embodiment. Moreover, by determining the arrival order of the pulses, as is done in the first embodiment, the MPU 30 is informed as to which equation to use (i.e., equation 1 or equation 2, explained above) in determining the interval td. Accordingly, the components shown in FIG. 16 are a combination of the components provided in FIGS. 9 and 12. The MPU 30 performs the determination of the arrival order and the difference of the respective starting points of the scan lines corresponding to the beams B1 and B2 so that an adjustment of the respective starting position of the beams for respective scan lines may be made. More specifically, the adjustment may be in the form of when the respective beams are turned on and modulated with image data.

Figure 17:
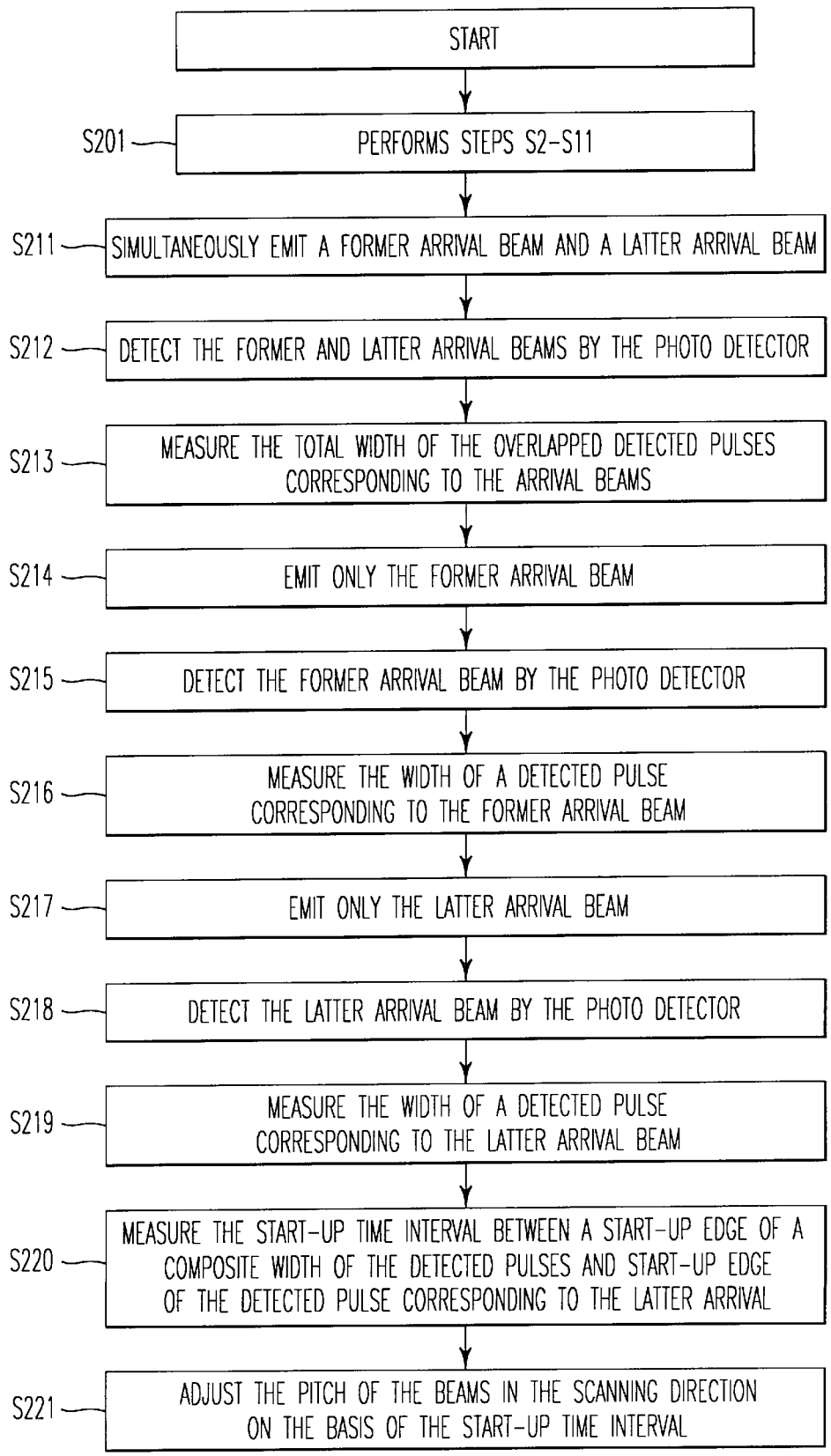
FIG. 17 is a flowchart of a process for synchronizing beams according to the third embodiment of the present invention.

The process associated with the third embodiment, is explained by way of FIG. 17. The process begins in step S201, where the steps S1–S11, as previously explained with respect to FIG. 11B are performed. Then, the process proceeds to steps S211–S221, where steps similar to steps S102–S112, are performed, on a former arrival beam and a later arrival beam, so as to adjust a pitch of the beams in a scanning direction on the basis of the start up time interval. In this way, the process performed in FIG. 17, is a composite of the processes shown in FIG. 11B and FIG. 15B.

The optical system of the present invention alternatively emits plural laser beams and detects synchronizing detection signal pulses in a signal Pd for each laser beam. Measuring the difference of the image form starting point between laser beams in the scanning direction on the basis of the synchronizing detection signal Pd, the starting point in the scanning may be revised accordingly.

The present invention precisely measures and automatically revises the difference of the starting positions of plural laser beams in the scanning direction. Therefore, when this optical system is employed in an image forming apparatus, the difference of the starting positions of plural laser beams in the optical system needs not to be adjusted separately. Furthermore, the present invention also allows for the adjustment of the difference of the starting positions of a plural laser beam which is changed over time.

The difference in starting position in the scanning direction can be similarly measured even in the case that three laser beams are used, even though the above-described embodiments are explained on the basis of two laser beams.

Furthermore, the sub-scanning pitch which is the distance in the vertical direction between beam scan lines is precisely measured and automatically revised according to the apparatus and method disclosed in U.S. patent application Ser. No. 08/786,203, which discloses a rotatable optical housing unit may be employed in the present invention. The optical housing unit is rotated about an axis in parallel to one of emitted light paths, so that a sub-scanning pitch is adjusted.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts, as well as implementation in software, hardware, or a combination of both within the principles of the invention to the full extent indicated by the broad general meaning of the terms in which the appended claims are expressed.

The mechanisms and processes set forth in the present description may be implemented using a conventional general purpose microprocessor programmed according to the teachings in the present specification, as will be appreciated to those skilled in the relevant art(s). Appropriate software coding can readily be prepared by skilled programmers based on the teachings of the present disclosure, as will also be apparent to those skilled in the relevant art(s).

The present invention thus also includes a computer-based product which may be hosted on a storage medium and include instructions which can be used to program a computer to perform a process in accordance with the present invention. This storage medium can include, but is not limited to, any type of disk including floppy disks, optical disks, CD-ROMs, magneto-optical disks, ROMs, RAMs, EPROMs, flash memory, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

The present document incorporates by reference the entire contents of Japanese priority document, JP-09-047828, filed in Japan on Mar. 3, 1996.

What is claimed is:

1. A method of adjusting a synchronous operation of optical beams scanned in a scanning direction on an intermediate image-forming surface, comprising the steps of:
   alternatively emitting a standard beam and another beam during respective scanning operations;
   detecting with a photodetector said standard beam and the another beam and producing a detecting signal that includes indications of when the photodetector detects the standard beam and the another beam;
   measuring from the detecting signal a first time interval (T1) between when said standard beam and the said another beam are detected;
   measuring from the detecting signal a second time interval (T2) between when the another beam and said standard beam are detected; and
   distinguishing an arrival order of the standard beam and the another beam using the first time interval and the second time interval.

2. The method of claim 1, further comprising the step of:
   adjusting a relative time of emission of said standard beam and said another beam so that an order of arrival of said standard beam and said another beam corresponds with a predetermined order of arrival.

3. The method of claim 1, further comprising the steps of:
   simultaneously emitting the standard beam and the another beam;
   detecting the respective arrival times of the standard beam and the another beam;
   measuring a total duration of when at least one of said standard beam and said another beam are detected by said photodetector;
   measuring in said detecting signal a start-up time interval between when a start-up edge of a first one of said standard beam and said another beam are detected by said photodetector and a start-up edge of a latter of said standard beam and said another beam are detected by said photodetector; and
   adjusting a pitch of the standard beam and the another beam in the scanning direction using the start-up time interval measured in the step of measuring a start-up time interval.

4. The method of claim 3, further comprising the steps of:
   measuring a standard beam width and another beam width when said standard beam and said another beam are alternatively emitted, wherein
   said step of measuring a start-up time interval comprises measuring the start-up edge of the total duration and
      subtracting the another beam width when said distinguishing step determines that said another beam arrives after said standard beam, and
      subtracting the standard beam width when said distinguishing step determines that said standard beam arrives after said another beam width; and
   adjusting the pitch of the beams in the scanning direction by an amount corresponding to a difference between said total duration and at least one of said standard beam width and said another beam width.

5. The method of claim 3, further comprising the steps of:
   measuring a width of a detected pulse corresponding to a last arriving beam detected by the photodetector, said last arriving beam being either said standard beam or said another beam;
   calculating the pitch as a calculated pitch of the standard beam and the another beam in the scanning direction based on the width measured in the measuring a width step; and
   adjusting the pitch of at least one of the standard beam and the another beam in the scanning direction on the basis of the calculated pitch.

6. A method of adjusting a synchronous operation of optical beams in a scanning direction on an intermediate image-forming surface, comprising the steps of:
   simultaneously emitting a standard beam and another beam;
   detecting at a detector respective arrival times of the standard beam and the another beam;
   measuring a total duration of when at least one of said standard beam and said another beam are detected by said detector;
   measuring a start-up time interval being between a start-up edge of a when a first one of said standard beam and said another beam are detected by said detector and a start-up edge of when a latter of said standard beam and said another beam are detected by said detector; and
   adjusting a pitch of at least one of the standard beam and the another beam in the scanning direction using the start-up time interval measured in the step of measuring a start-up time interval.

7. A method of adjusting a synchronous operation of optical beams in a scanning direction on an intermediate image-forming surface, comprising the steps of:
   emitting only a standard beam during a first scanning operation;
   detecting said standard beam;
   emitting only a second beam during a second scanning operation;

detecting said second beam;

measuring a first time interval (T1) between when said standard beam is detected and when said second beam is detected during the second scanning operation;

emitting only the second beam during a third scanning operation;

detecting the second beam;

emitting only the standard beam during a fourth scanning operation;

detecting the standard beam;

measuring a second time interval (T2) between when said standard beam is detected during the third scanning operation and when said second beam during the fourth scanning operation; and determining an arrival order of beams at a photodetector using the first time intervals and the second time interval.

8. The method of claim 7, further comprising the step of:

adjusting a beam pitch in the scanning direction by an amount corresponding to a difference between the first time interval T1 and the second time interval T2.

9. The method of claim 7, further comprising the steps of:

simultaneously emitting the standard beam and the second beam;

detecting a time of arrival of said standard beam and said second beam; and subtracting a time of arrival of a first arriving beam of the standard beam and the second beam from a time of arrival of a second arriving beam of the standard beam and the second beam and determining an amount of beam adjustment needed to align a time of arrival of the standard beam and the second beam.

10. A multiple optical beam scanning system comprising:

means for alternatively emitting a standard beam and another beam during respective scanning operations;

means for detecting said standard beam and the another beam and for producing a detecting signal that includes indications of when the standard beam and the another beam are detected;

means for measuring from the detecting signal a first time interval (T1) between when said standard beam and the said another beam are detected by the detecting means;

means for measuring from the detecting signal a second time interval (T2) between when the another beam and said standard beam are detected by the detecting means; and means for distinguishing an arrival order of the standard beam and the another beam using the first time interval and the second time interval.

11. The system of claim 10, further comprising:

means for simultaneously emitting the standard beam and another beam;

means for detecting the respective arrival times of the standard beam and the another beam;

means for measuring a total duration of when at least one of said standard beam and said another beam are detected by said detecting means;

means for measuring in said detecting signal a start-up time interval between when a start-up edge of a first one of said standard beam and said another beam are detected by said detecting means and a start-up edge of a latter of said standard beam and said another beam are detected by said detecting means; and means for adjusting a pitch of the standard beam and the another beam in the scanning direction using the start-up time interval measured by the means for measuring a start-up time interval.

12. The system of claim 11, further comprising:

means for measuring a standard beam width and another beam width when said standard beam and said another beam are alternatively emitted; wherein said means for measuring a start-up time interval comprises means for measuring the start-up edge of the total duration, and for subtracting the another beam width when said means for distinguishing determines that said another beam arrives after said standard beam, for subtracting the standard beam width when said means for distinguishing determines that said standard beam arrives after said another beam width, and for adjusting the pitch of at least one of the standard beam and the another beam in the scanning direction by an amount corresponding to a difference between said total duration and at least one of said standard beam width and said another beam width.

13. A multiple optical beam scanning system comprising:

means for simultaneously emitting a standard beam and another beam;

means for detecting respective arrival times of the standard beam and the another beam;

means for measuring a total duration of when at least one of said standard beam and said another beam are detected by said means for detecting;

means for measuring a start-up time interval being between a start-up edge of when a first one of said standard beam and said another beam are detected by said means for detecting and a start-up edge of a latter of said standard beam and said another beam are detected by said means for detecting; and means for adjusting a pitch of at least one of the standard beam and the another beam in the scanning direction using the start-up time interval measured by the means for measuring a start-up time interval.

14. A multiple optical beam scanning system comprising:

means for emitting only a standard beam during a first scanning operation;

means for detecting said standard beam;

means for emitting only a second beam during a second scanning operation;

means for detecting said second beam;

means for measuring a first time interval (T1) between when said standard beam is detected and when said second beam is detected during the second scanning operation;

means for emitting only the second beam during a third scanning operation;

means for detecting the second beam;

means for emitting only the standard beam during a fourth scanning operation;

means for detecting the standard beam;

means for measuring a second time interval (T2) between when said standard beam is detected during the third scanning operation and when said second beam is detected during the fourth scanning operation; and means for determining an arrival order of beams using the first time interval and the second time interval.

15. The system of claim 14, further comprising:

means for adjusting a beam pitch in the scanning direction by an amount corresponding to a difference between the first time interval T1 and the second time interval T2.

16. The system of claim 14, further comprising:

means for simultaneously emitting the standard beam and the second beam;

means for detecting a time of arrival of said standard beam and said second beam;

means for subtracting a time of arrival of a first arriving beam of the standard beam and the second beam from a time of arrival of a second arriving beam of the standard beam and the second beam and for determining an amount of beam adjustment needed to align a time of arrival of the standard beam and the second beam.

17. A computer-based multiple optical beam scanning system comprising:

a light source configured to alternately emit a standard beam and another beam during respective scanning operations;

a rotatable mirror located in paths of the standard beam and the another beam, said standard beam and said another beam reflecting off of said rotatable mirror within a predetermined angular range;

an image forming body on which said standard beam and said another beam form scan lines;

a photodetector located adjacent to said image forming body and configured to produce a signal indicative of when said standard beam and said another beam illuminate the photodetector;

a beam controller, comprising a processor having a computer storage medium and a computer program code mechanism embedded in the computer storage medium for adjusting an alignment of said standard beam and said another beam, said computer program code mechanism comprising, a first computer code mechanism configured to measure a first time interval T1 between when said standard beam and said another beam are alternatively emitted by said light source and then detected by said photodetector, a second computer code mechanism configured to measure a second time interval T2 between when said standard beam and said another beam are alternatively emitted by said light source and then detected by said photodetector, a third computer code mechanism configured to distinguish an order of arrival of said standard beam and said another beam by comparing the first time interval T1 with the second time interval T2, and a fourth computer code mechanism configured to control said light source so as to adjust a relative time when said standard beam and said another beam are enabled for respective predetermined scanning operations.

18. The system of claim 17, wherein:

said computer program code mechanism further comprises, a fifth computer code mechanism configured to control said light source to simultaneously emit said standard beam and said another beam and measure a total duration over which said standard beam and said another beam illuminate said photodetector during respective scanning operations, a sixth computer code mechanism configured to subtract from said total duration an amount of time when a latter arriving beam, of said standard beam and said another beam as determined by said third computer code mechanism, illuminates said photodetector so as to determine an amount by which to adjust at least one of said standard beam and said another beam, and a seventh computer code mechanism configured to adjust said at least one of said standard beam and said another beam by said amount determined by said sixth computer code mechanism.

19. A computer-based multiple optical beam scanning system comprising:

a light source configured to alternately emit a standard beam and another beam during respective scanning operations;

a rotatable mirror located in paths of the standard beam and the another beam, said standard beam and said another beam reflecting off of said rotatable mirror within a predetermined angular range;

an image forming body on which said standard beam and said another beam form scan lines;

a photodetector located adjacent to said image forming body and configured to produce a signal indicative of when said standard beam and said another beam illuminate the photodetector;

a beam controller, comprising a processor having a computer storage medium and a computer program code mechanism embedded in the computer storage medium for adjusting an alignment of said standard beam and said another beam, said computer program code mechanism comprising, means for measuring a first time interval T1 between when said standard beam and said another beam are alternatively emitted by said light source and then detected by said photodetector, means for measuring a second time interval T2 between when said standard beam and said another beam are alternatively emitted by said light source and then detected by said photodetector, means for distinguishing an order of arrival of said standard beam and said another beam by comparing the first time interval T1 with the second time interval T2, and means for controlling said light source and adjusting a relative time when said standard beam and said another beam are enabled for respective predetermined scanning operations.

20. The system of claim 19, wherein:

said computer program code mechanism further comprises, means for controlling said light source to simultaneously emit said standard beam and said another beam and measure a total duration over which said standard beam and said another beam illuminate said photodetector during respective scanning operations, means for subtracting from said total duration an amount of time when a latter arriving beam, of said standard beam and said another beam as determined by said means for distinguishing, illuminates said photodetector so as to determine an amount by which to adjust at least one of said standard beam and said another beam, and means for adjusting said at least one of said standard beam and said another beam by said amount determined by said means for subtracting.

* * * * *